July 24, 1934.  J. B. ARMITAGE  1,967,733
MILLING MACHINE
Filed March 12, 1932  7 Sheets-Sheet 1

INVENTOR
Joseph B Armitage
By Fred G Parsons
ATTORNEY

July 24, 1934.  J. B. ARMITAGE  1,967,733

MILLING MACHINE

Filed March 12, 1932  7 Sheets-Sheet 2

INVENTOR
Joseph B Armitage
Fred G Parsons
ATTORNEY

July 24, 1934.  J. B. ARMITAGE  1,967,733
MILLING MACHINE
Filed March 12, 1932  7 Sheets-Sheet 5

INVENTOR
Joseph B Armitage
BY
Fred G Parsons
ATTORNEY

July 24, 1934.    J. B. ARMITAGE    1,967,733
MILLING MACHINE
Filed March 12, 1932    7 Sheets-Sheet 6

INVENTOR
Joseph B Armitage
BY
Fred A Parsons
ATTORNEY

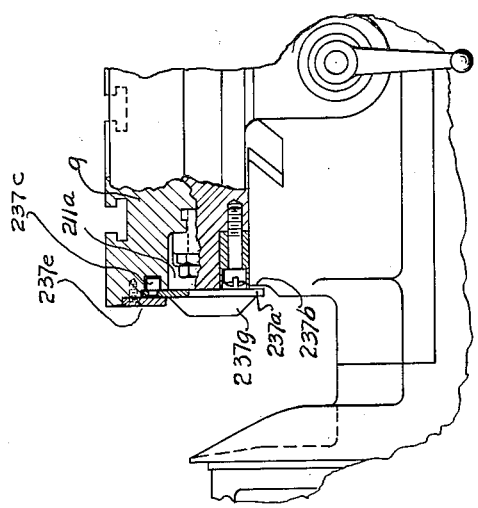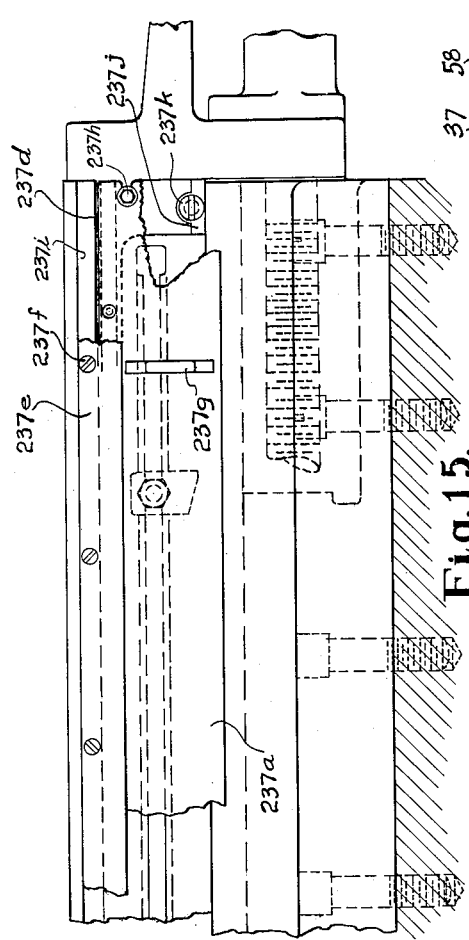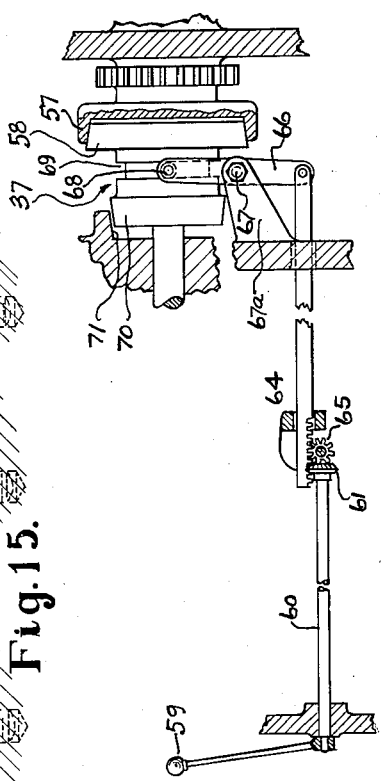

Patented July 24, 1934

1,967,733

UNITED STATES PATENT OFFICE 1,967,733

MILLING MACHINE

Joseph B. Armitage, Wauwatosa, Wis., assignor to Kearney & Trecker Corporation, West Allis, Wis.

Application March 12, 1932, Serial No. 598,349

9 Claims. (Cl. 90—21)

This invention relates to machine tools and particularly to milling machines.

It is an object generally to simplify and improve the design, construction, and operation of the structure and transmission of milling machines and of machine tools generally.

A further object is to provide a structure having great rigidity together with exceptional convenience of operation, repair, and adjustment.

A further object is to provide a novel type of milling machine.

A further object is to provide such a machine having a work table which is readily removable from the machine together with its driving mechanism for inspection, adjustment, etc.

A further object is to provide such a machine in which the table and its transmission are adapted for ready interchange with others of similar or of different type.

A further object is to provide means for lubricating such a transmission including a reservoir for fluid for lubricating or other purposes.

A further object is to provide means for readily connecting such a transmission for operation and control from other mechanism of the machine.

A further object is to provide for automatic control of the movements of the table.

A further object is to provide for rendering such automatic control inoperative when desired.

A further object is to provide mechanism for such control which is in part removable with said table.

A further object is to provide a readily removable closure for exposed parts of said mechanism such as adjustable dogs and trips, so constituted as to prevent access of chips, coolant or other foreign material thereto.

Other objects and advantages will be apparent from the following specification and accompanying drawings in which:

Fig. 13 is a detail partly in section of certain clutch operating connections indicated in Fig. 5.

Fig. 14 is a right side view of a portion of the machine partially broken away to show a dog enclosing recess.

Fig. 15 is a front view of a portion of the machine, partially broken away showing a movable closure.

Like reference characters have been applied to the same parts throughout the drawings and specification.

Figures 1, 2:
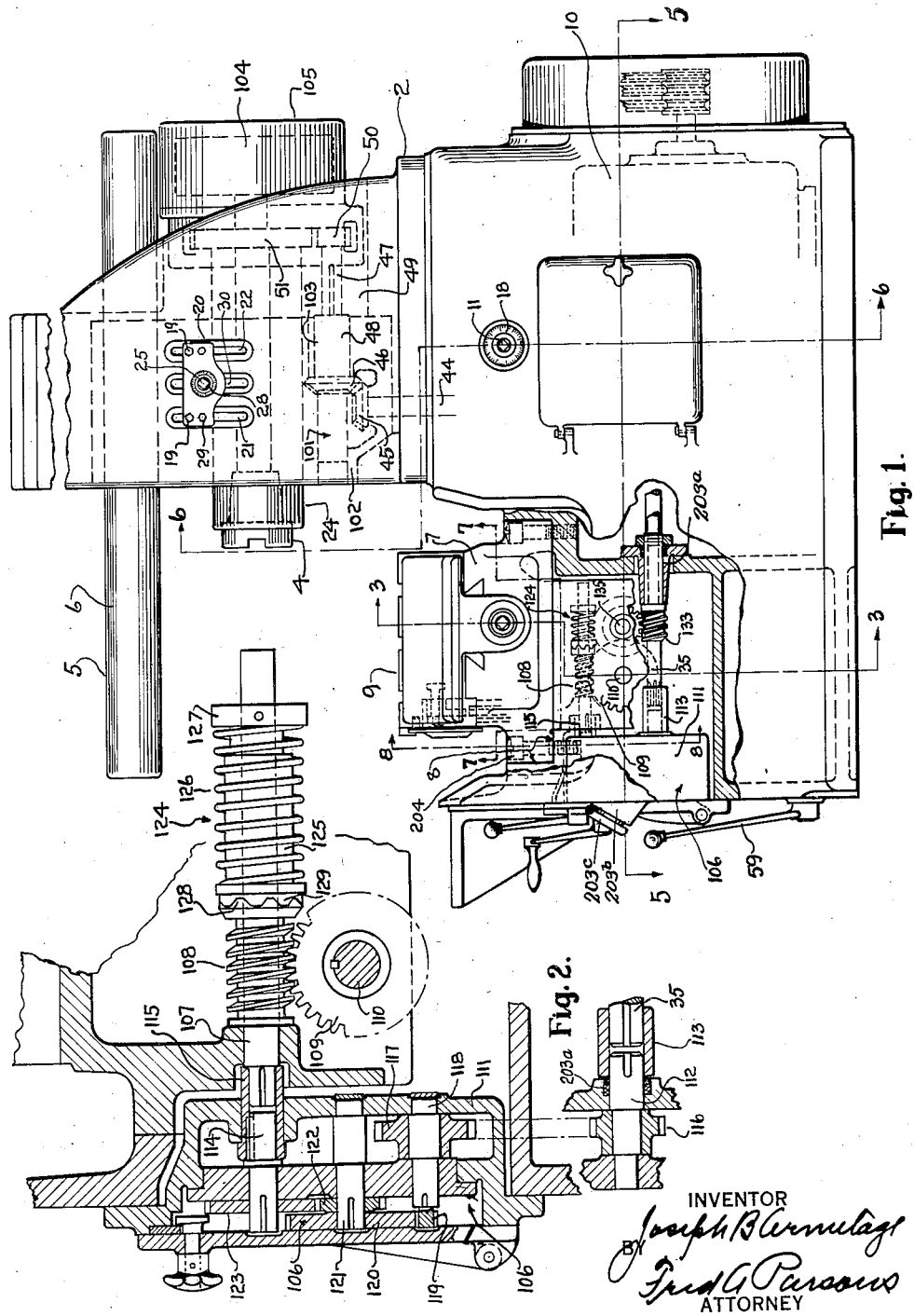
Fig. 1 is a right side elevation of a machine embodying the invention.
Fig. 2 is a sectional detail of certain mechanism indicated in Fig. 1.
Figures 3, 4:
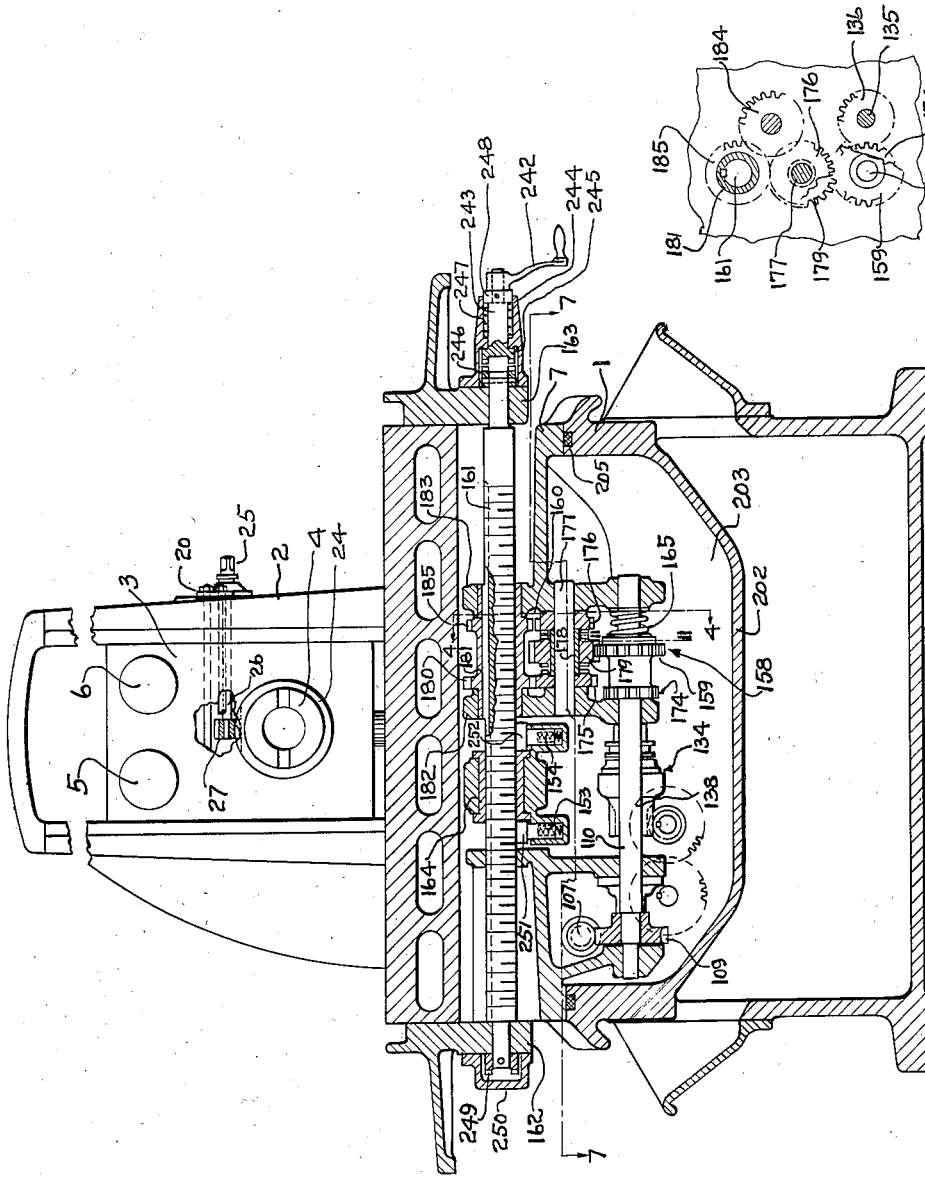
Fig. 3 is a sectional view of the machine taken on the line 3—3 of Fig. 1.
Fig. 4 is a sectional view on the line 4—4 of Fig. 3.

The machine as shown in Fig. 1 comprises a bed or base 1 supporting thereon a head frame or support generaly denoted by numeral 2, the head frame supporting for vertical adjustment a spindle carrier or support 3, Fig. 3, carrying rotatably supported therefrom a tool spindle or support 4, the carrier also having adjustably fixed therein overarms 5 and 6 for use in certain operations of the machine in familiar manner. Bed 1 also supports a saddle or support 7 fixed in a suitable recess 8, Fig. 1, in base 1, the saddle carrying for reciprocation in a path transverse to spindle 4 a work table or support 9. Spindle 4 and table 9 may be moved through suitable transmission means, fully described below, from a power source, in the present instance indicated as a motor 10 which may be conveniently housed within bed 1. Spindle carrier 3 may be vertically adjusted by means of a crank, or the like, not shown, applied to a squared portion 11 of a shaft 12, Fig. 6, journaled in base 1 and driving, through bevel gears 13 and 14, a vertical screw shaft 15 restrained against axial movement by means of a suitable bearing 16 in base 1 and extending upwardly to engage a nut portion 17 fixed with carrier 3, a dial 18, Fig. 1, being movably fixed with shaft 12 for indicating movements of carrier 3 in familiar manner. Carrier 3 may be clamped in desired adjusted positions by means of bolts 19—19, Fig. 1, extending through a plate 20 slidable on the outside of head frame 2, the bolts extending through slots 21 and 22 in head frame 2 and suitable bores in carrier 3 to engage T-slots 23, Fig. 6, formed in a portion of head frame 2, tightening of the bolts serving to deform the walls of head frame 2 sufficiently to clamp carrier 3 rigidly therein.

Figure 6:
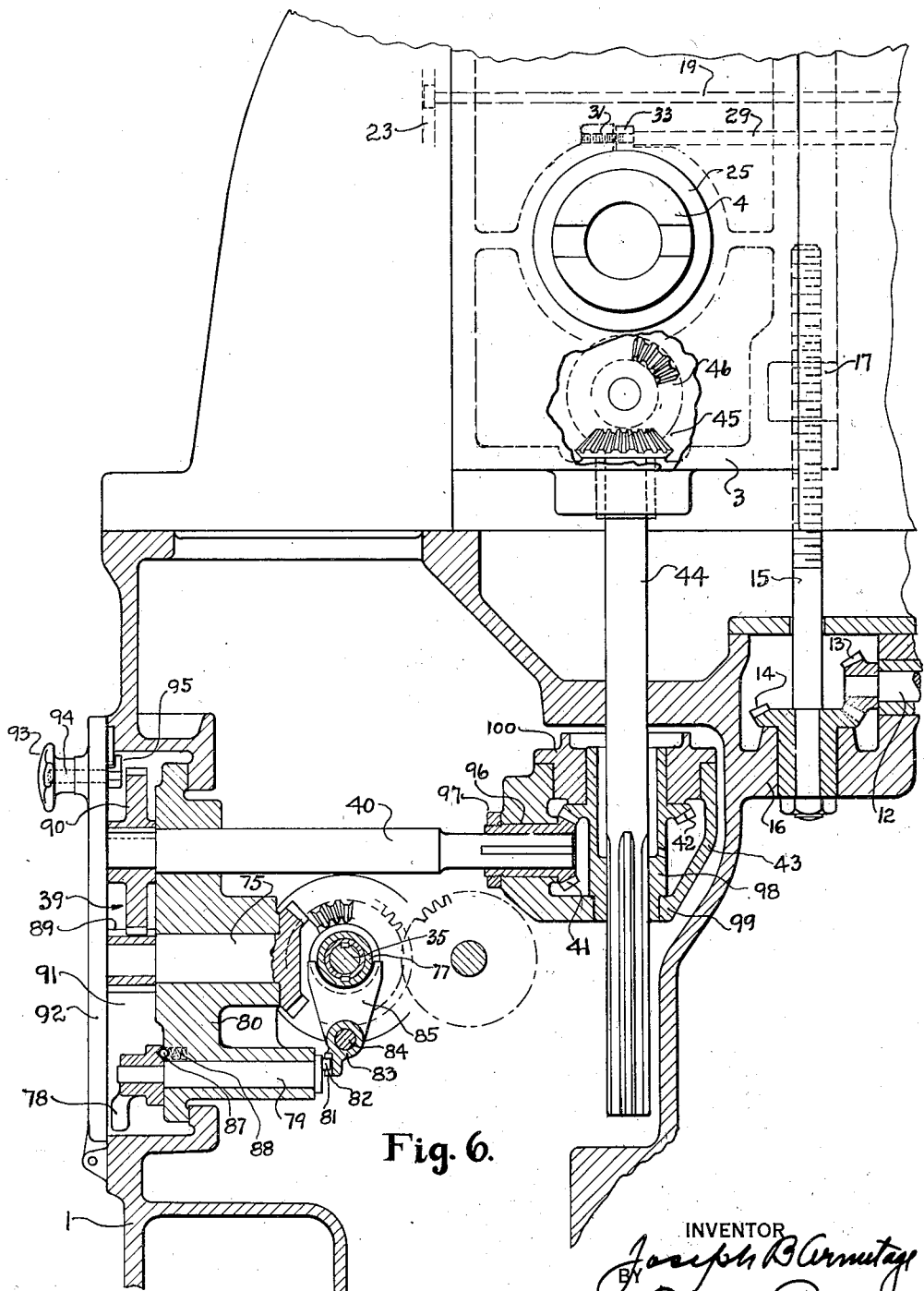
Fig. 6 is a sectional view on the line 6—6 of Fig. 1.

Spindle 4, as particularly shown in Fig. 3, is journaled in a quill member 24 slidable in carrier 3 for longitudinal adjustment of spindle 4 relative to table 9, the quill being movable by means of a crank, or the like, applied to a squared portion 25 of a shaft 26 journaled in plate 20 and carrier 3 and having a gear 27 fixed therewith to engage suitable rack teeth formed in quill 24 whereby rotation of the shaft will cause movement of the quill. A dial 28, Fig. 1, may be fixed with shaft 26 to indicate movement of the shaft and consequently of quill 24. Quill 24 may be clamped in desired adjusted position by means of bolts 29 and 30, Fig. 1, extending through plate 20 and above mentioned slots 21 and 22 into suitable bores in carrier 3, as shown in Fig. 6, the bolts threadedly engaging bosses, or the like, 31 and 32 formed on a slotted portion of carrier 3, and through other bosses 33 and 34, in carrier 3, tightening the slotted portion of carrier 3 against quill 24 to clamp it rigidly with carrier 3.

The train for rotating spindle 4 originating in motor 10 is as follows: Motor 10 drives a shaft 35, Fig. 5, through a multiple belt drive generally denoted by numeral 36 and a clutch brake combination generaly denoted by numeral 37. Shaft 35 drives, through a reverser generally denoted by numeral 38, and a rate changer generally denoted by numeral 39, a shaft 40, Fig. 6, shaft 40 driving, through bevel gears 41 and 42 meshed together within a suitable housing 43 fixed with a portion of base 1, a vertical shaft 44 extending upwardly into carrier 3 and driving, through bevel gears 45 and 46, a shaft 47, Fig. 1, slidably keyed in an elongated hub portion 48 of gear 46 and journaled in a housing 49 depending from quill 24, shaft 47 driving spindle 4 through a gear 50 fixed with the shaft and meshing with a gear 51 fixed with the spindle. Axial movement of spindle 4 and quill 24 may accordingly be permitted through the slidable relation of shaft 47 with hub portion 48.

Figure 5:
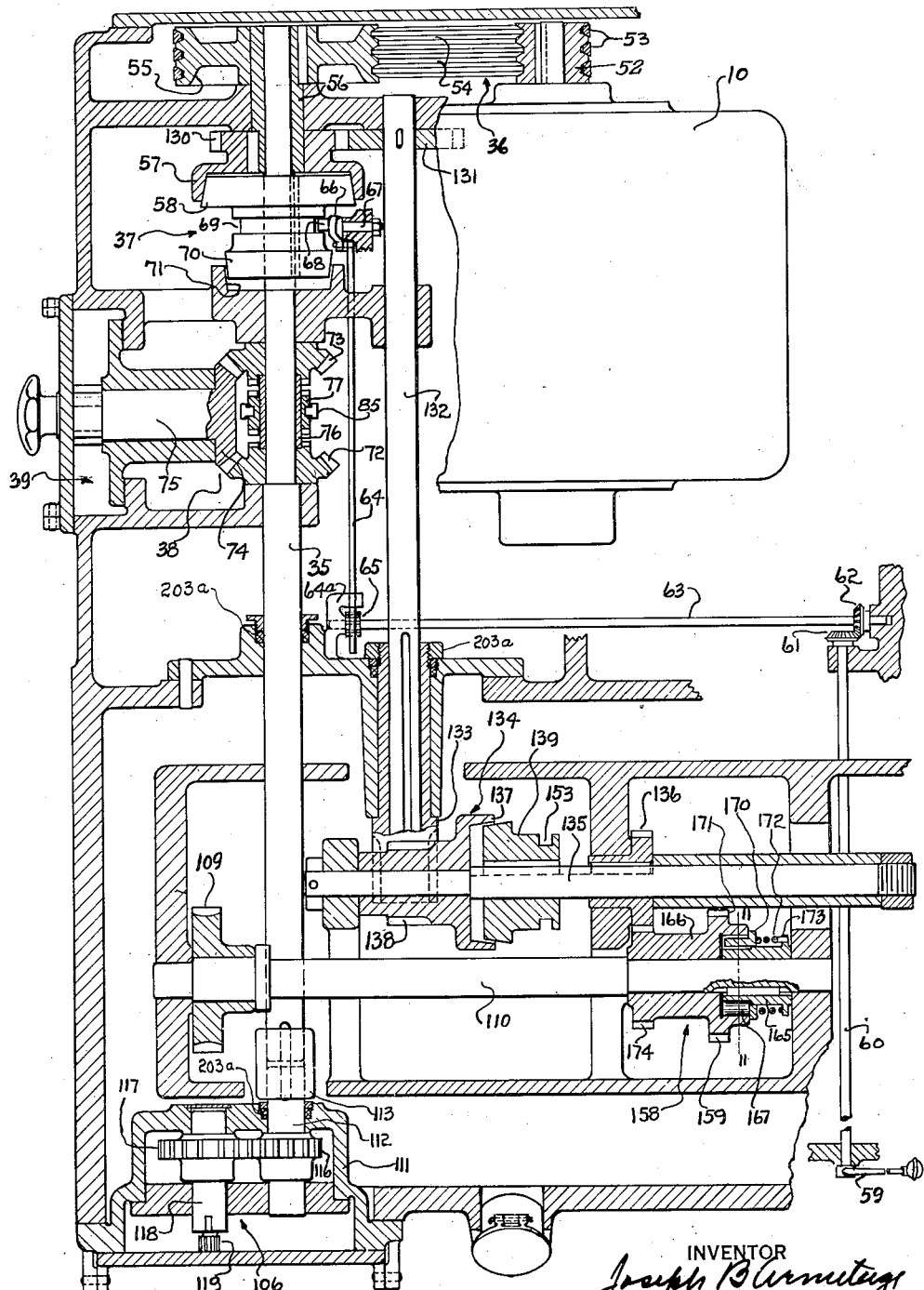
Fig. 5 is a horizontal sectional view of the machine taken on the line 5—5 of Fig. 1, showing certain power trains.

Drive 36 comprises a pulley 52, Fig. 5, driven from motor 10 and having a plurality of grooves 53—53 for the accommodation of belts 54—54 driving a pulley 55 suitably grooved to receive the belts, pulley 55 being fixed with and driving a sleeve 56 journaled in a suitable bearing in base 1 and having fixed therewith a member 57 forming a portion of clutch 37, the bore of sleeve 56 forming a bearing for shaft 35.

Clutch 37 comprises above mentioned member 57 and a member 58, Figs. 5 and 13, slidably keyed with shaft 35, the members having suitable interengaging friction surfaces such that when member 58 is moved, for example, to the right in Fig. 13, it will be driven from member 57 and thus establish a driving connection between pulley 55 and shaft 35. Member 58 may be so moved from a hand lever 59 located at a convenient point relative to table 9 and fixed with a shaft 60 journaled in the bed and driving, through bevel gears 61 and 62, a shaft 63 also journaled in base 1, shaft 63 actuating a rod 64 slidable in a bracket portion 64a fixed with base 1, a gear 65 fixed with shaft 63 engaging suitable rack teeth formed in rod 64. Rod 64 is pivoted to a lever 66, more particularly shown in Fig. 13, fixed with a shaft 67, journaled in a bracket portion 67a of bed 1 and forming a fulcrum for the lever, a shoe, or the like, 68 being carried by lever 66 and engaging an annular groove 69 formed in member 58.

Member 58 has a brake portion 70 fixed therewith and adapted when member 58 is moved to the left in Fig. 13 to engage a bore 71 formed in a portion of base 1 to provide a braking action when desired.

Reverser 38 comprises bevel gears 72 and 73 spaced apart and journaled on shaft 35 and engaged with a bevel gear 74 fixed with a shaft 75 journaled in a portion of base 1. Gears 72 and 73 are spaced by means of a sleeve or bushing 76 slidably keyed with shaft 35, the sleeve having slidably keyed therewith a clutch member 77. Member 77 has suitable clutch teeth for engagement when moved, for example, downwardly in Fig. 5 with clutch teeth formed upon gear 72 and other clutch teeth arranged for engagement when member 77 is moved upwardly in Fig. 5 with clutch teeth formed on gear 73. Thus either gear 72 or 73 may be clutched to shaft 35 and caused to drive gear 74. Clutch member 77 may be so moved by means of a hand lever 78, Fig. 6, fixed with a shaft 79 journaled in a portion 80 of base 1, the shaft carrying an eccentric pin or shoe 81 engaging a slot 82 in a shifter member 83 slidable on a rod 84, a forked portion 85 of the shifter engaging an annular groove 86 formed in clutch member 77. Lever 78 is provided with suitable recesses for the accommodation of a detent 87 pressed thereagainst by a spring 88 for yieldably maintaining the parts in shifted position.

Rate changer 39 comprises gears 89 and 90 slidably keyed respectively with shafts 75 and 40 meshed together within a housing 91 associated with base 1 and having a hinged closure member 92, a grip portion 93 fixed with a shaft 94 facilitating opening and closing of member 92 and a latch portion 95 fixed with shaft 94 serving to maintain member 92 in closed position. Gears 89 and 90 may be removed and interchanged or replaced with others of different ratio also interchangeable for obtaining different rates of operation of shaft 40 and accordingly of spindle 4.

Gears 41 and 42 are enclosed in above mentioned housing 43, gear 41 having a sleeve or hub portion 96 journaled in the housing and being maintained in proper axial position by a collar, or the like, 97 fixed with the sleeve. Gear 42 is fixed with a sleeve portion 98 journaled at its lower end in a bearing portion 99 of housing 43 and at its upper end in a member 100 forming a closure for housing 43. Sleeve 98 is slidably keyed with above mentioned shaft 44, the shaft accordingly being permitted to move vertically with the adjustments of spindle carrier 3 but being maintained at all times in driving relation with gear 42. Gear 46 is fixed with a sleeve member generally denoted by numeral 101, Fig. 1, journaled in bearings 102 and 103 fixed with spindle carrier 3, the sleeve having a suitable bore for accommodating above mentioned shaft 47 in slidably keyed relation. Spindle 4 is provided with a flywheel 104 fixed therewith and enclosed in a suitable housing 105 fixed with carrier 3.

A feed drive for table 9 originates in above mentioned shaft 35, Fig. 5, the shaft driving, through a rate changer generally denoted by numeral 106, a shaft 107, Figs. 1 and 2, journaled in saddle 7 carrying a worm 108 driving a worm wheel 109 fixed with a shaft 110, Fig. 3, forming a terminal element of the feed train.

Rate changer 106 is contained in a suitable removable housing 111, as more particularly shown in Figs. 1 and 2, shaft 35 being coupled with a shaft 112 of the rate changer by means of a coupling 113 and shaft 107 being coupled with a shaft 114 of the rate changer by means of a coupling 115. The rate changer, as particularly shown in Figs. 2 and 5, includes a gear 116 fixed with shaft 112 and driving a gear 117 fixed with a shaft 118 journaled in a portion of housing 111, shaft 118 having fixed therewith a gear 119 meshing with and driving a gear 120 removably keyed with a shaft 121 journaled in a portion of housing 111, shaft 121 having also removably keyed therewith a gear 122 driving a gear 123 removably keyed with above mentioned shaft 114. Shaft 118 is formed in the neighborhood of gear 119 for the reception of removable gears not shown, and the various gears may be removed and interchanged or replaced with others interchangeable in various combinations for producing a variety of different rates in shafts 114 and 107.

Worm 108 is journaled on shaft 107 and driven through an overload release device generally denoted by numeral 124 comprising a sleeve member 125 slidably keyed with shaft 107 and forced to the left in Fig. 2 by means of a spring 126 engaging the sleeve at one end and a collar, or the like, 127 at the other, the collar being fixed with shaft 107. Worm 108 and sleeve 125 have interengaging clutch teeth 128 and 129 of a form adapted under overload conditions to cause sleeve 125 to be forced to the right against the pressure of spring 126 whereby excessive torque in shaft 107 is relieved.

A rapid traverse train for table 9 originates in a gear 130, Fig. 5, fixed with clutch member 57 whereby the rapid traverse train is operable independently of the condition of engagement of clutch 37. Gear 130 drives, through a gear 131 meshed therewith, a shaft 132 journaled in base 1 and driving, through a spiral gear 133, a clutch generally denoted by numeral 134, the clutch driving a shaft 135 journaled in saddle 7 and carrying a gear 136 transmitting the drive to above mentioned shaft 110.

Clutch 134 comprises a driving member 137 constituting the terminal element of the rapid traverse train journaled on shaft 135 and having fixed therewith a spiral gear 138 adapted to engage above mentioned gear 133. Member 137 has a suitable friction surface for engagement with a friction surface on a driven member 139 slidably keyed with shaft 135 and movable into and out of engagement with member 137. Clutch member 139 may be so moved from a hand lever 140, Figs. 7 and 10, fixed with a shaft 141 journaled in base 1, the shaft having a lever 142 fixed therewith and extending into engagement with a slot 143 formed in a member 144 fixed with a shifter rod 145 slidable axially in saddle 7. Rod 145 has fixed therewith a member 146, Fig. 9, engaging, through a slot 147 therein, a shoe, or the like, 148 fixed with a shifter fork member 149 pivoted on a stud 150 supported in saddle 7, the fork member having an arm 151 extending downwardly and carrying a pivoted shoe 152 engaging an annular groove 153 formed in clutch member 139. Movement of lever 140 to the right in Fig. 7 will accordingly cause movement of clutch member 139 into engagement with clutch member 137. Rod 145 extends through a portion 154 of saddle 7 and is continually urged to the left in Fig. 7 by means of a suitable spring 155 disposed on the rod and acting in a recess 156 in portion 154 between a collar 157 fixed with rod 145 and portion 154. Spring 155 accordingly serves to maintain rapid traverse clutch 134 yieldingly in disengaged position and to return it to such position automatically upon release of lever 140.

The feed and rapid traverse trains combine in an overrunning clutch or device generally denoted by numeral 158, Fig. 5, the drive continuing to table 9 through a gear 159 driven from clutch 158 and driving, through a reverser generally denoted by numeral 160, Fig. 3, a table screw 161 journaled in bearings 162 and 163 fixed with table 9 and adapted to prevent relative axial movement of the screw and table, screw 161 engaging a nut portion 164 fixed with a portion of saddle 7 whereby rotation of the screw will cause sliding movement of the table in familiar manner.

Figure 11:
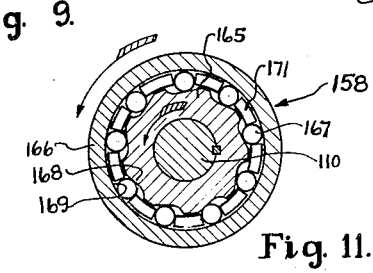
Fig. 11 is a sectional view of an overrunning clutch taken on the line 11—11 of Figs. 3 and 5.

Overrunning clutch 158 comprises an inner member 165 fixed with shaft 110 as shown in Figs. 5 and 11 and driving an outer member 166 through a plurality of rolls 167 disposed respectively between cam recesses 168 in member 165 and a bore 169 in member 166, the contour of the recesses 168 being such as to cause the rolls upon rotation of member 165 in one direction to wedge between the recesses and bore 169 and establish a positive driving relation between members 165 and 166, the rolls acting, however, in the event of a tendency of outer member 166 to run at a greater rate than inner member 165, to release their grip upon the surface of bore 169 and permit such rapid motion of member 166 without interference from or with member 165. Rolls 167 are continuously urged in a direction opposite to the rotation of member 165 by means of a cage or retainer member 170 having fingers 171 extending between the rolls, member 170 being so urged by a torsion spring 172 disposed about a portion of member 165 and anchored in a flange 173 fixed therewith. Member 165, as above noted, is fixed with shaft 110 and member 166 may be driven from the rapid traverse train through above mentioned gear 136 meshing with a gear 174 fixed with the member.

Reverser 160 comprises gears 175 and 176, Fig. 3, spaced apart on a shaft 177 by means of a sleeve 178 journaled on the shaft, a clutch gear 179 journaled on sleeve 178 engaging above mentioned gear 159 on overrunning clutch 158. Gear 179 has suitable clutch teeth for engagement upon movement in one direction with suitable clutch teeth on gear 175 and other clutch teeth for engagement upon movement in the opposite direction with clutch teeth on gear 176, the gear having an intermediate position in which it engages neither of the gears 175 and 176 and having a sufficiently wide face to remain always in engagement with gear 159. Gear 175 drives, through a gear 180, a sleeve 181 journaled in suitable bearings 182 and 183 fixed with saddle 7 and having a suitable bore for free axial movement of table screw 161. Sleeve 181 is slidably keyed with the table screw 161 so that upon engagement of clutch gear 179 with gear 175 rotation of table screw 161 in one direction may result through gear 180 and sleeve 181. Gear 176 drives through an idler 184, Fig. 4, a gear 185 fixed with sleeve 181 whereby engagement of clutch gear 179 with gear 176 will cause rotation of table screw 161 in the opposite direction.

Figure 7:
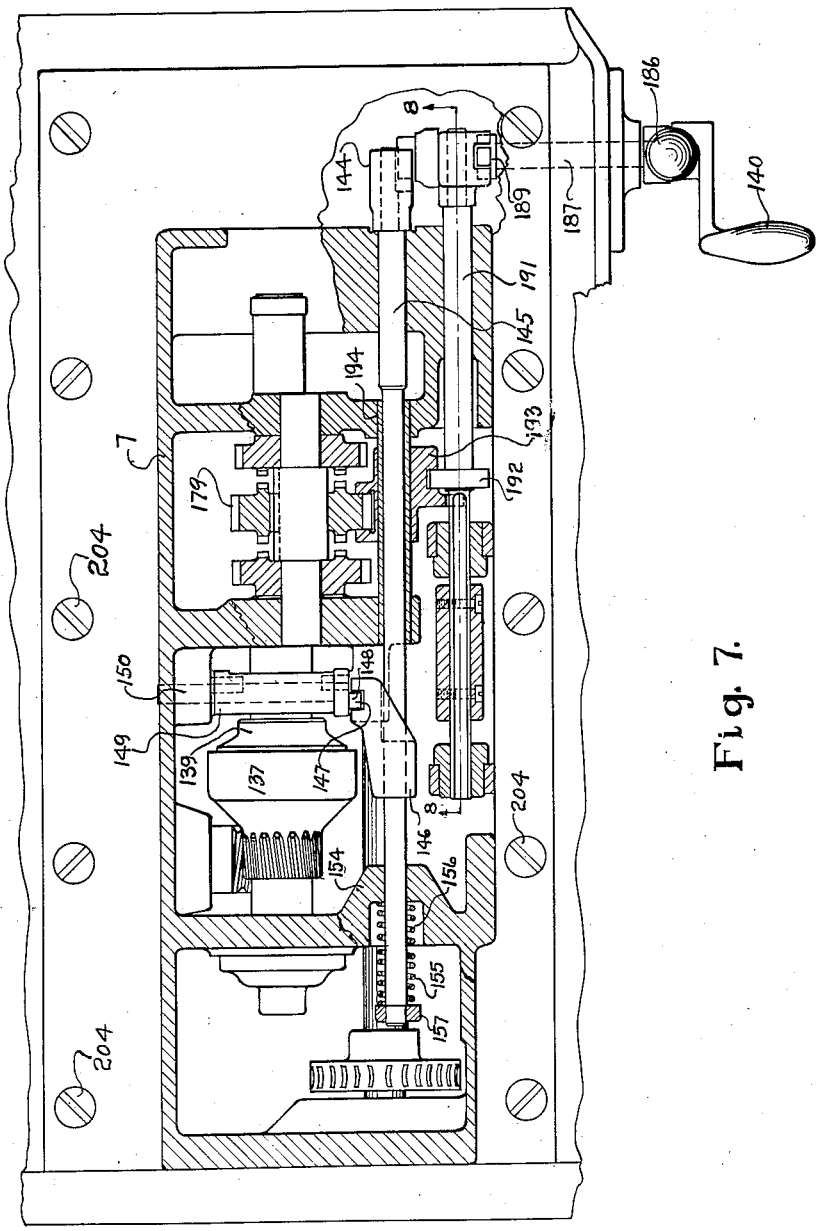
Fig. 7 is a horizontal sectional view taken on the line 7—7 of Fig. 3.
Figure 8:
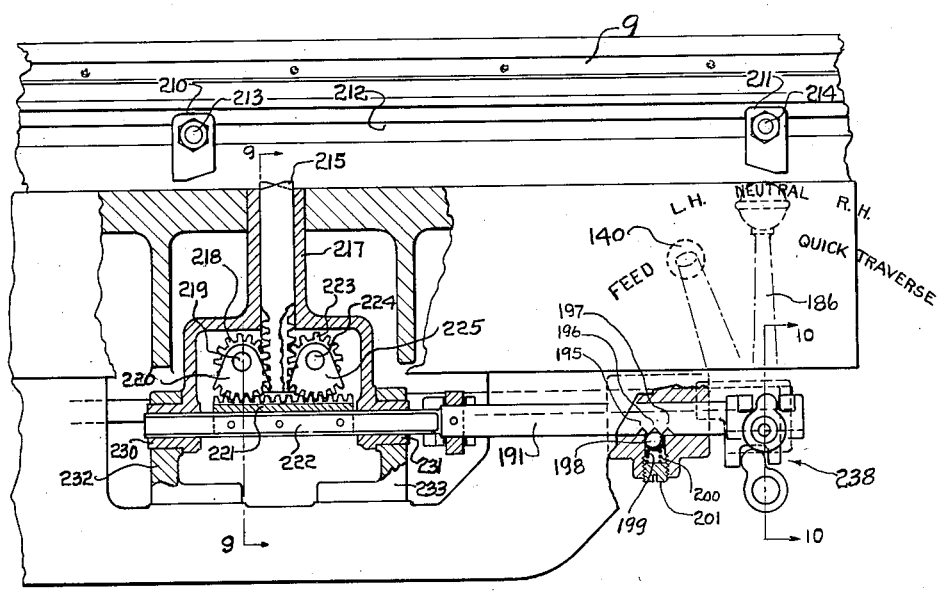
Fig. 8 is a vertical sectional view on the line 8—8 of Figs. 1 and 7.
Figures 9, 10, 12:
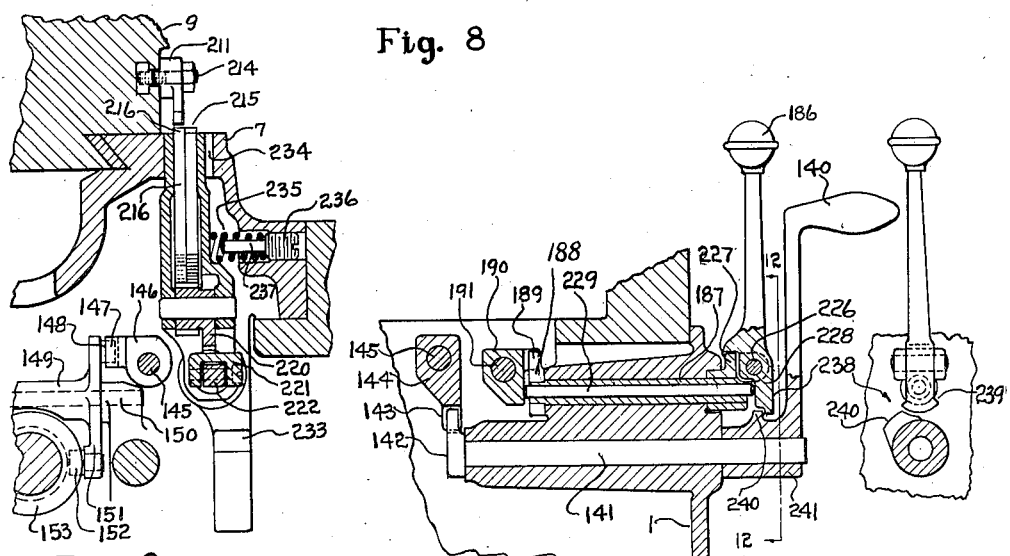
Fig. 9 is a sectional view on the line 9—9 of Fig. 8.
Fig. 10 is a sectional view on the line 10—10 of Fig. 8.
Fig. 12 is a sectional detail of an interlock taken on the line 12—12 of Fig. 10.

Clutch gear 179 may be shifted from a hand lever 186, Figs. 7 and 10, the lever being pivotally fixed with a sleeve 187 journaled in base 1 and having fixed therewith a lever 188 having an end portion engaging a slot 189 in a member 190 fixed with a shifter rod 191 slidably supported in saddle 7. Rod 191 actuates, through a collar 192 fixed therewith, a shifter member 193 slidable on a sleeve 194 fixed in a portion of saddle 7 and providing a bearing for above mentioned rod 145, member 193 having suitable projecting portions engaging the sides of clutch gear 179 whereby movement of rod 191 will shift the gear. Rod 191, as shown in Fig. 8, has a plurality of notches 195, 196 and 197 for engagement with a detent 198 in the form of a ball, or the like, movable in a bore 199 and pressed upwardly by a spring 200 retained in the bore by means of a plug 201, the ball acting to maintain the parts in one or another of their shifted positions.

As particularly apparent from Figs. 1 and 3, saddle 7 constitutes a unitary member carrying a portion of the mechanism for moving table 9, the whole being bodily removable from base 1 and interchangeable with others of similar or different types. A wall portion 202 of base 1 forms a chamber or reservoir 203 for containing lubricant or other fluid and acts as a housing for the mechanism of saddle 7, shafts 35, 112, 132, and coupling 115, when they enter the chamber passing through suitable fluid retaining devices generally denoted by numeral 203a. There being a variety of such devices of familiar form which would be suitable, they are not illustrated specifically. The saddle may be held in place in above mentioned recess 8 by any suitable means, in the present instance indicated as screws or bolts 204—204 which may be closely fitted into suitable bores in the saddle and bed if desired for accurately locating the saddle relative to the other parts of the machine, or other suitable or well-known means may be depended upon for accomplishing such location. Fluid may be prevented from escaping through the joint between saddle 7 and base 1 by means of suitable packing, or the like, received in a groove 205 formed in base 1. Fluid may be added to the reservoir 203 by the means of a filler pipe 203b, Fig. 1, having a channel communicating with the reservoir, and having a hinged cap or lid 203c.

The exchange of saddle 7 with others may be performed with great facility, it being merely necessary when it is desired to remove saddle 7 to remove rate changer 106, thus releasing the worm shaft 107 from any connection with base 1 or shaft 35. This may be readily done through the provision of couplings 113 and 115. The saddle is then free upon removal of bolts 204, to be lifted vertically from base 1, gear 138 on rapid traverse clutch 134 disengaging from worm 133 which remains in base 1 on rapid traverse shaft 132. Similarly shifter rods 145 and 191, Figs. 7 and 10, disengage from actuating levers 142 and 188, members 144 and 190 rising out of engagement with the levers which remain in place in base 1. When it is desired to replace saddle 7, worm 133 and gear 138 automatically engage, upon lowering of the saddle into position, and members 144 and 190 engage with control levers 142 and 188. Upon replacement of rate changer 106 all driving and control connections between saddle 7 and base 1 are reestablished. It is thus possible to readily remove and replace saddle 7 for inspection or adjustment or to replace it with another of different characteristics or properties, it being merely necessary to provide in each saddle a gear corresponding to rapid traverse gear 138, a feed drive shaft corresponding to shaft 107 and controls corresponding to rods 145 and 191. The mechanism will be thoroughly lubricated by means of fluid contained in reservoir 203, the parts running at all times in a bath of lubricant.

It is contemplated that a saddle embodying a fluid operated transmission might be interchanged with saddle 7 in which event reservoir 203 could serve to supply fluid to such transmission. The drives from shafts 35 and 132 could readily be connected to appropriate parts of such a transmission and the controls thereof could be readily adapted to connect with levers 142 and 188.

Table 9 may be automatically stopped at desired points by means of dogs 210 and 211, disposed in a recess 211a, Fig. 14, in the front of table 9, Figs. 8 and 9, and fixed at desired points in a T-slot 212 by suitable means such as bolts 213 and 214, engaging plungers 215 and 216 respectively vertically slidable in a carrier member 217, the plungers in the present instance being located in a common plane transverse to the path of travel of table 9. Plunger 215 has suitable rack teeth adapted to engage a gear 218 journaled on a stud 219 fixed with carrier 217, the gear having fixed therewith a sector 220 extending downwardly into engagement with a rack 221 fixed with an extended portion 222 of rod 191. Plunger 216 has suitable rack teeth engaging a gear 223 journaled on a stud 224 fixed with carrier 217, the gear having fixed therewith a sector 225 also extending downwardly into engagement with above mentioned rack 221. Lowering of one plunger accordingly causes movement of rack 221 and rod 191 in one direction and raising of the opposite plunger. Dogs 210 and 211 have cam portions at different distances from table 9 whereby each affects one plunger and not the other. Thus in the present instance dog 210 contacts plunger 215 at such times as the plunger is raised, but does not contact plunger 216. In like manner dog 211 contacts plunger 216 and not plunger 215.

Under certain conditions it becomes desirable to permit table 9 to move beyond the point at which one of dogs 210 or 211 would normally cause it to stop. For this purpose means are provided to move plunger carrier 217 sufficiently for plungers 215 and 216 to avoid dogs 210 and 211 respectively during travel of the table in a given direction. This is accomplished through a right and left movement, as seen in Fig. 10, of hand lever 186, the lever being pivoted, as above noted, on a pin 226 fixed with a member 227 fixed with above mentioned sleeve 187. A downwardly projecting portion 228 of lever 186 acts against an end portion of a rod 229 slidable in sleeve 187 and bearing against a lower portion of member 190. Thus upon movement of lever 186 to the right in Fig. 10, rod 229 will be forced to the left and will cause rotation of member 190 and rod 191 in a clockwise direction as seen in Fig. 10. Portion 222 of rod 191 is of angular cross section as indicated in Fig. 9 and fits slidably in hub portions 230 and 231 of supporting carrier 217, the hubs being journaled in suitable bearings 232 and 233 supported from a portion of saddle 7. Such rotation of rod 191 accordingly causes movement to the right in Fig. 9 of carrier 217, clearance 234 being provided between it and saddle 7 to accommodate such movement. Carrier 217 is normally maintained in its extreme left position, as indicated, by means of a spring 235 bearing thereagainst maintained in compression by means of a plug 236 threaded in a suitable bore in a portion of saddle 7 and having a dowel or extension 237 to prevent displacement of the spring.

Assuming table 9 to be moving to the right in

Fig. 8, dog 210 would normally be approaching plunger 215 which would be raised, the dog upon reaching a predetermined desired point depressing the plunger sufficiently to move rod 191 to the left and, through the above described connections, shifting clutch gear 179 into its middle or neutral position and stopping the table. Under the above conditions, if it is desired to continue the movement beyond plunger 215, lever 186 is moved to the right in Fig. 10 thereby, as above explained, moving plunger carrier 217 to the right as seen in Fig. 9. This will move plunger 215 out of the path of dog 210, whereupon the dog may pass by the plunger without affecting it. It is to be noted that such movement of plunger carrier 217 will place plunger 216 in the path of dog 210, but this plunger during movement of table 9 in this direction would be in its lowered position and accordingly also unaffected by dog 210. A similar method of operation is available during travel of table 9 to the left, plunger 216 then being movable out of the path of dog 211 when it is desired to move the table beyond a point at which automatic stop would otherwise take place.

To protect the dogs and plungers from accumulations of dirt, chips, or the like, and from unauthorized manipulation or adjustment, a closure member 237a, Figs. 13 and 14, depends from an upper portion of table 9 and extends over the open front of above mentioned recess 211a into close proximity or sliding engagement with a ledge portion 237b of saddle 7, so as to form therewith a dirt excluding and fluid shedding enclosure for the control mechanism. Member 237a has pins 237c fixed therewith and extending into a groove 237d in the face of table 9, the member being maintained against the face by a strip member 237e fastened to the table by any suitable means such as screws 237f, the pins 237c being slidable in the slot 237d whereby the closure 237a may be moved longitudinally of table 9 to expose the recess 211a and dogs 210 and 211 for inspection or adjustment.

Grip portions 237g are provided fixed with the closure member to facilitate such movement and any suitable locking means such as a set screw 237h may be used to fix closure member 237a with the table to prevent undesired displacement thereof. Strip 237e may be fixed in a groove or undercut portion 237i of table 9 is desired whereby it will be flush with the front thereof and more effectively shed coolant fluid, chips, etc. finding their way over the edge of the table.

To permit removal of table 9 from saddle 7 without disturbing plungers 215 and 216, a portion 237j is removably fitted at one end of recess 211a and held in place by suitable means such as a screw 237k, the removal of this portion providing space for passage of the end of the table over the plungers, but the portion, when in place, effectually closing the opening which would otherwise have to be left at the end of the table.

The dogs and plungers are thus completely enclosed when in operation and in fact at all times except when in process of being adjusted, so that the possibility of interference with their operation by accumulations of chips or other material is virtually eliminated.

It is conceivable that under certain conditions some well known type of lock might be substituted for set screw 237h in order to prevent unauthorized access to the dogs and plungers, suitable fastening means being substituted for screws 237f which can be removed only with difficulty.

It is desirable that this possibility of avoiding the action of dogs 210 and 211 be available during feed rate travel only and accordingly an interference device generally denoted by numeral 238, Figs. 10 and 12, is provided. An arcuate flange portion 239 extends downwardly from portion 228 of lever 186 and a cam 240 extends upwardly from a hub portion 241 of lever 140. When lever 186 is in its normal position, cam portion 240, upon movement of lever 140, passes to the left of flange portion 239, as seen in Fig. 10, allowing free movement of lever 140 and accordingly the use of the rapid traverse at any time desired. When, however, lever 186 is moved to the right in Fig. 10 in order to cause plungers 215 and 216 to avoid dogs 210 and 211, flange portion 239 moves into the range of movement of cam 240 and prevents such movement, as indicated in Fig. 12. This is true regardless of the position of lever 186, whether in forward or reverse position or in neutral. On the other hand, lever 186 is free to be moved to the right in Fig. 10 at such times as lever 140 is in its extreme left position, as seen in Fig. 12, when the rapid traverse is disengaged, but whenever lever 140 is moved to the right in Fig. 8 for engaging the rapid traverse, cam 240 takes a position behind flange 239 and prevents all lateral movement of lever 186. Plungers 215 and 216 accordingly cannot then be rendered inoperative by any movement of lever 186 during rapid traverse operation so that the rapid movements of the table are always under automatic control of dogs 210 and 211.

Means are provided in the form of a crank 242, Fig. 3, fixed with a shaft 243 for moving table 9 by hand, the shaft being slidably journaled in a member 244 fixed with table 9. Shaft 243 drives, through a clutch member 245 fixed therewith, a clutch member 246 fixed with table screw 161, the clutch members being normally maintained yieldably out of engagement with each other by a spring 247 disposed in a suitable bore in member 244 and acting between a portion thereof and a collar 248 fixed with shaft 243. Crank 242 is accordingly disconnected from table screw 161 during normal operation of the machine so that it is not rotated by power and does not become a source of danger to the operator. When hand movement of table 9 is desired, however, the crank may be readily engaged with the table screw by merely forcing it to the left in Fig. 3 against the resistance of spring 247. A clutch member 249 is fixed with table screw 161 at the opposite end from clutch member 246 and housed by a removable closure member 250, the closure being interchangeable with member 244 whereby the crank may be applied to either end of the screw desired, or if advisable, a duplicate of member 244, crank 242, etc. may be fixed with bearing 162 for convenient hand operation of the table from either end.

For protecting screw 161 and nut 164 from the effects of foreign material which might be carried on the screw, wipers 251 and 252 are provided slidable in saddle 7 and pressed into contact with screw 161 by means of springs 153 and 154 respectively.

The above being a complete description of an illustrative embodiment of the invention, what is claimed is:

1. In a milling machine, the combination of a bed, a tool spindle rotatably supported from said bed for bodily movement in a plurality of paths one of which is transverse to the axis thereof, a saddle removably supported from said bed, a table supported and guided by said saddle for horizontal reciprocatory movement in a path transverse to said spindle axis, locating means associated with said bed and saddle for fixing a predetermined relative position thereof and adapted for bodily removal of said saddle and replacement thereof in said predetermined position, driving mechanism for said spindle having a branch connectible for driving said table, said branch including a pair of intermeshed elements, one associated with said bed and another associated with said saddle, and said locating means serving when said saddle is placed in position on said bed to so place said elements as to cause substantially accurate intermeshing thereof whereby said saddle may be removed from said bed without first disconnecting said driving train and replaced thereon without attention to said train, said train being broken and reestablished at said elements by merely removing and replacing said saddle.

2. In a milling machine, the combination of a bed, a spindle rotatably supported from said bed for bodily movement in a plurality of paths, a saddle, a table supported and guided by said saddle for horizontal reciprocatory movement in a path transverse to the axis of said spindle, said bed and saddle having engaged surfaces forming a tongue and groove extending substantially parallel with the path of movement of said table, means including said tongue and groove for fixing a predetermined relative position of said saddle and bed and adapted for bodily removal of said saddle and replacement thereof in said predetermined position, said bed providing an upwardly open recess underneath said saddle and between the side walls of said groove, and driving mechanism for said table including a portion supported for bodily removal with said saddle and housed within said recess.

3. In a milling machine, the combination of a bed, a tool spindle rotatably supported from said bed for bodily movement in a plurality of paths one of which is transverse to the axis thereof, a saddle removably supported from said bed, a table supported and guided by said saddle for horizontal reciprocatory movement in a path transverse to said spindle axis, means associated with said bed and saddle for fixing a predetermined relative position thereof and adapted for bodily removal of said saddle and replacement thereof in said predetermined position, said bed providing an upwardly open recess underneath said saddle and adapted to retain liquid, and means for adding liquid to said recess when said saddle is in position on said bed.

4. In a milling machine, the combination of a bed, a spindle rotatably supported from said bed for bodily movement in a plurality of paths, a saddle, a table supported and guided by said saddle for horizontal reciprocatory movement in a path transverse to the axis of said spindle, said bed and saddle having engaged surfaces forming a tongue and groove extending substantially parallel with the path of table movement, means including said groove and said saddle surfaces for fixing a predetermined relative position of said saddle and bed and adapted for bodily removal of said saddle and replacement thereof in said predetermined position, said bed providing an upwardly open recess underneath said saddle and between the side walls of said groove, said recess being adapted to retain liquid, and means for adding liquid to said recess when said saddle is in position on said bed.

5. In a milling machine, the combination of a bed, a spindle rotatably supported from said bed for bodily movement in a plurality of paths, a saddle, a table supported and guided by said saddle for horizontal reciprocatory movement in a path transverse to the axis of said spindle, said bed and saddle providing engaged surfaces forming a tongue and groove extended substantially in the direction of table reciprocation, means including said groove and said saddle surfaces for fixing a predetermined relative position of said saddle and bed and adapted for bodily removal of said saddle and replacement thereof in said predetermined position, driving mechanism for said table including elements relatively shiftable to disengage the driving relationship thereof, and trip elements carried by said saddle to be bodily removable therewith and having motion transmitting connection with some of said elements for the shifting thereof.

6. In a milling machine, the combination of a rotatable spindle, a table, said spindle and table being relatively movable in a direction transverse to the spindle axis, a transmission for said relative movement including a feed train, a quick traverse train, means shiftable for effecting said relative movement from the one or the other of said trains and in the one or the other direction, a trip element connected for operation of some of said shiftable means and adapted to be dog actuated, a dog adapted to contact and actuate said trip element during said relative movement, and a housing substantially enclosing said trip element and said dog in directions transverse to said relative movement and in any position thereof, said housing being adapted to permit said relative movement between said dog and trip element and providing a portion manually operable for access to said dogs and elements whereby to admit of relative adjustment therebetween.

7. In a milling machine, the combination of a rotatable spindle, a table horizontally reciprocable in a direction transverse to the spindle axis, a transmission for movement of said table including a device shiftable for changing the effect of said transmission, a trip element adjacent said table and connected for shifting said device, a dog adjustably supported on said table and adapted during table movement to contact and actuate said trip element whereby to shift said device, and a housing normally substantially enclosing said trip element and dog in directions transverse to said table movement while permitting of relative movement therebetween, said housing providing a portion manually operable into a position with respect to other portions in which said dog and trip element are exposed for relative adjustment instead of enclosed.

8. In a milling machine, the combination of a rotatable spindle, a table horizontally reciprocable in a path transverse to the axis of said spindle, a table transmission including means shiftable for alternatively effecting a change from the one to the other direction of table movement and for effecting a change from a fast traverse movement to a relatively slow feed movement in one of said directions, a trip element adjacent said table and connected to shift some of said shiftable means, a dog adjustably fixed on said table and adapted during table movement to contact and actuate said trip element whereby to effect a change in table movement, and a housing substantially enclosing said dog and trip element in directions transverse to said table movement, said housing providing a portion manually movable from its normal trip enclosing position to permit of access to said dog and trip for relative adjustment thereof.

9. In a milling machine, the combination of a rotatable spindle, a table horizontally reciprocable in a path transverse to the axis of said spindle, a table transmission including means shiftable for alternatively effecting a change from the one to the other direction of table movement and for effecting a change from a fast traverse movement to a relatively slow feed movement in one of said directions, a trip element adjacent said table and connected to shift some of said shiftable means, a dog adjustably fixed on said table and adapted during table movement to contact and actuate said trip element whereby to effect a change in table movement, and a housing substantially enclosing said dog and trip element in each direction transverse to the direction of table movement, said housing being formed in part by portions of said table and having another portion movable relative to said table out of its normal trip enclosing position to permit of access to said dog and trip for relative adjustment thereof.

JOSEPH B. ARMITAGE.